United States Patent
Nagai et al.

(10) Patent No.: US 6,983,765 B2
(45) Date of Patent: Jan. 10, 2006

(54) METHOD OF PRODUCING FLUID UNIT

(75) Inventors: Shigekazu Nagai, Adachi-ku (JP); Hiroshi Matsushima, Ryugasaki (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/260,579

(22) Filed: Oct. 1, 2002

(65) Prior Publication Data

US 2003/0062092 A1 Apr. 3, 2003

(30) Foreign Application Priority Data

Oct. 2, 2001 (JP) ........................... 2001-306148

(51) Int. Cl.
*F16K 1/00* (2006.01)

(52) U.S. Cl. .................... 137/884; 29/890.124
(58) Field of Classification Search .............. 137/884; 29/890.124, 890.127
See application file for complete search history.

(56) References Cited

U.S. PATENT DOCUMENTS

| | | |
|---|---|---|
| 5,320,497 A | 6/1994 | Nagai et al. |
| 6,086,041 A * | 7/2000 | Gattuso et al. ......... 251/129.06 |
| 6,317,977 B1 * | 11/2001 | Iijima et al. ................ 137/884 |
| 6,363,970 B1 * | 4/2002 | Wolter .................... 137/625.65 |
| 6,453,948 B2 * | 9/2002 | Notz et al. .................. 137/884 |

FOREIGN PATENT DOCUMENTS

| | | |
|---|---|---|
| DE | 195 45 532 | 6/1996 |
| DE | 199 60 335 | 7/2000 |
| DE | 100 51 126 | 5/2001 |
| JP | 2-140078 | 11/1990 |
| JP | 4121500 | 4/1992 |
| JP | 5-4185 | 1/1993 |
| JP | 8-170748 | 7/1996 |
| JP | 2000-55225 | 2/2000 |
| JP | 3178717 | 4/2001 |
| JP | 3199721 | 6/2001 |
| JP | 3229613 | 9/2001 |

* cited by examiner

*Primary Examiner*—John Fox
(74) *Attorney, Agent, or Firm*—Paul A. Guss

(57) ABSTRACT

First to sixth annular projections and first to sixth annular recesses, which have shapes corresponding to shapes of first to sixth conventional seal members, are formed respectively at portions at which various types of blocks and first and second intermediate plates are joined, by performing resin molding with molds. Ultrasonic welding is performed while the first to sixth annular projections face the first to sixth annular recesses, respectively.

9 Claims, 8 Drawing Sheets

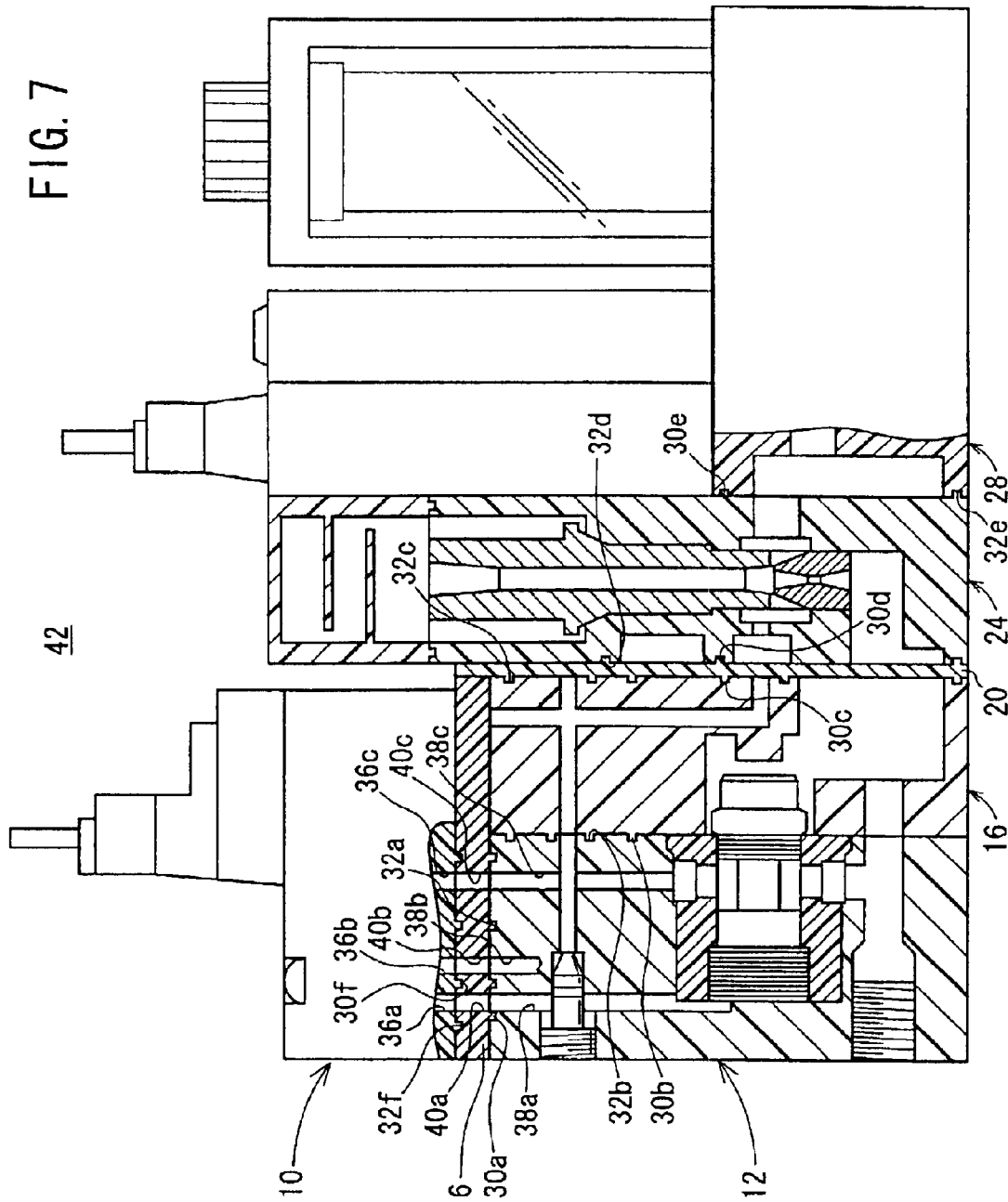

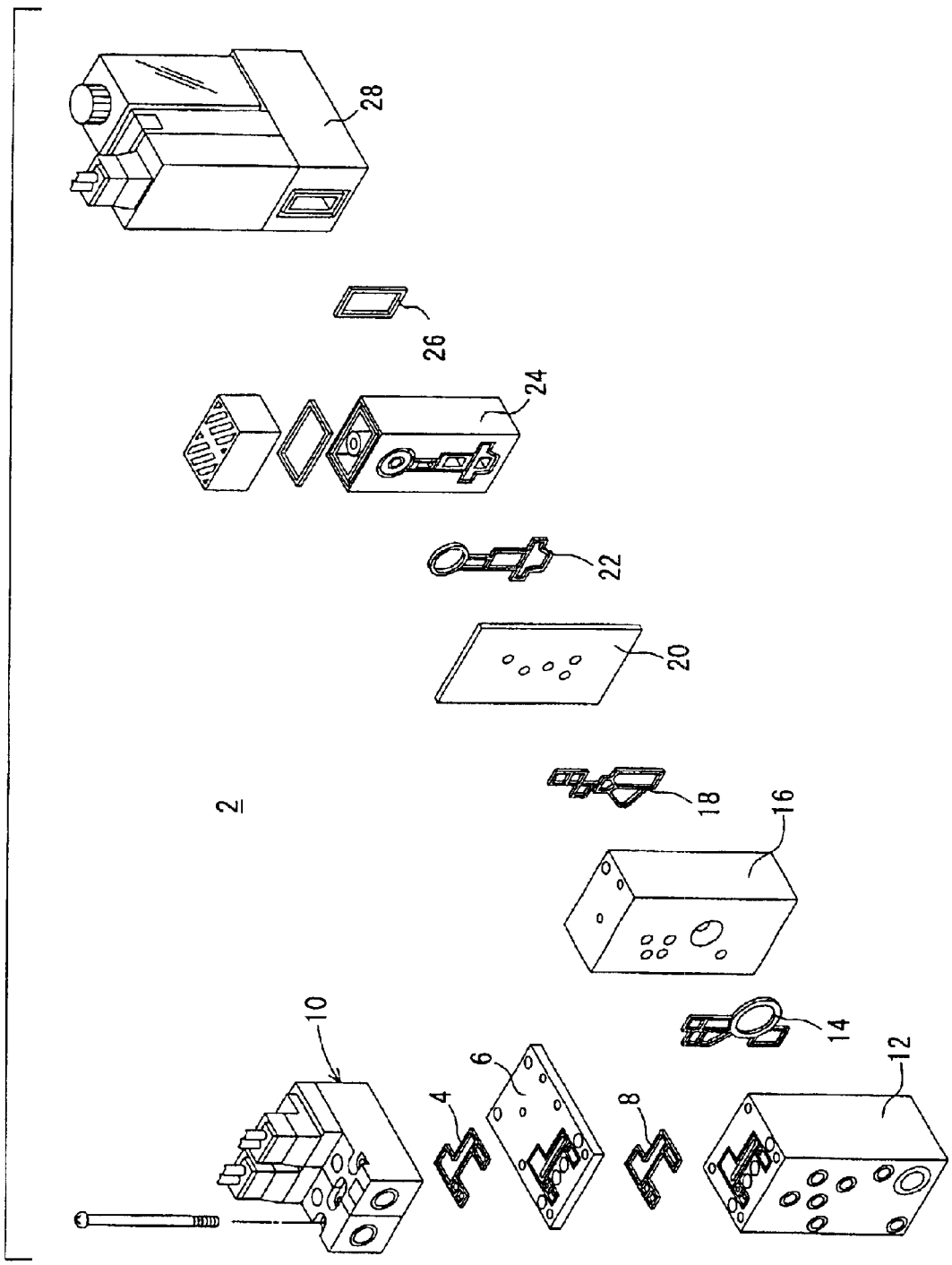

US 6,983,765 B2

METHOD OF PRODUCING FLUID UNIT

BACKGROUND OF THE INVENTION

1. Field of the Invention

The present invention relates to a method of producing a fluid unit capable of supplying a negative pressure fluid, for example, to operation equipment such as a suction pad.

2. Description of the Related Art

A fluid unit is used for supplying a negative pressure fluid to a suction pad. A workpiece is transported to a desired position by attracting the workpiece with the suction pad.

A fluid unit proposed by the present applicant is shown in FIG. 8 (see, for example, Japanese Patent Publication Nos. 3178717, 3199721, and 3229613).

The fluid unit 2 comprises a first valve mechanism block 12 on which a solenoid-operated valve 10 is mounted with a first seal member 4, a first intermediate plate 6, and a second seal member 8 interposed therebetween, and a second valve mechanism block 16 connected to the first valve mechanism block 12 with a third seal member 14 interposed therebetween.

An ejector block 24 is connected to one side of the second valve mechanism block 16 with a fourth seal member 18, a second intermediate plate 20, and a fifth seal member 22 interposed therebetween. Further, a filter block 28 is connected to the ejector block 24 with a sixth seal member 26 interposed therebetween.

The respective first to sixth seal members 4, 8, 14, 18, 22, 26 are provided between the adjoining blocks or between the block and the intermediate plate to seal the passages between the communicating blocks or between the block and the intermediate plate air-tightly.

The respective blocks and the intermediate plates are connected to one another by a plurality of bolts or the like, and thus the fluid unit 2 is assembled.

SUMMARY OF THE INVENTION

A general object of the present invention is to provide a method of producing a fluid unit in which assembling operation is simplified by reducing the number of parts of the apparatus so that production cost may be reduced.

According to the present invention, various types of blocks of a fluid unit are ultrasonically welded to one another, and blocks and intermediate plates are ultrasonically welded to one another. Accordingly, respective joined portions are sealed and a plurality of seal members become unnecessary. Further, the assembling operation is simplified.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a partial vertical sectional view illustrating the fluid unit in which the various types of blocks, the intermediate plates, and other components are integrally connected to one another by the ultrasonic welding; and FIG. 8 is an exploded perspective view illustrating a fluid unit proposed by the present applicant.

DESCRIPTION OF THE PREFERRED EMBODIMENTS

Figure 1:
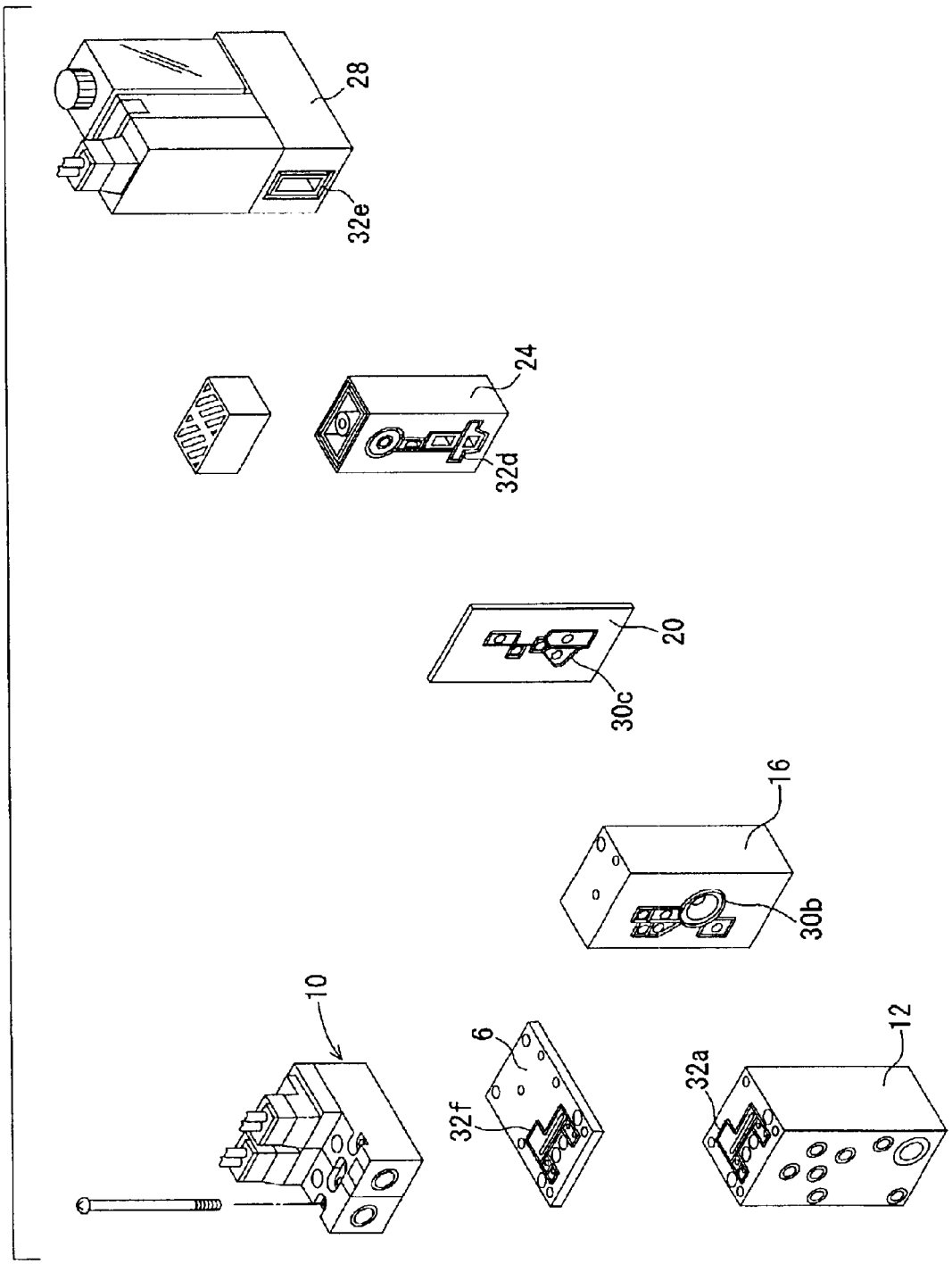
FIG. 1 is an exploded perspective view illustrating a fluid unit to be produced by a method of producing the fluid unit according to an embodiment of the present invention.

A method of producing a fluid unit according to the present invention will be explained in detail below with reference to the accompanying drawings, as exemplified by a preferred embodiment.

The components that are same as those of the fluid unit shown in FIG. 8 are designated by the same reference numerals, and detailed explanation thereof will be omitted.

Various types of blocks such as a first valve mechanism block 12, a second valve mechanism block 16, an ejector block 24, and a filter block 28 as well as first and second intermediate plates 6, 20 are formed by resin molding with resin materials by using unillustrated molds respectively (see FIG. 1).

Figure 2:
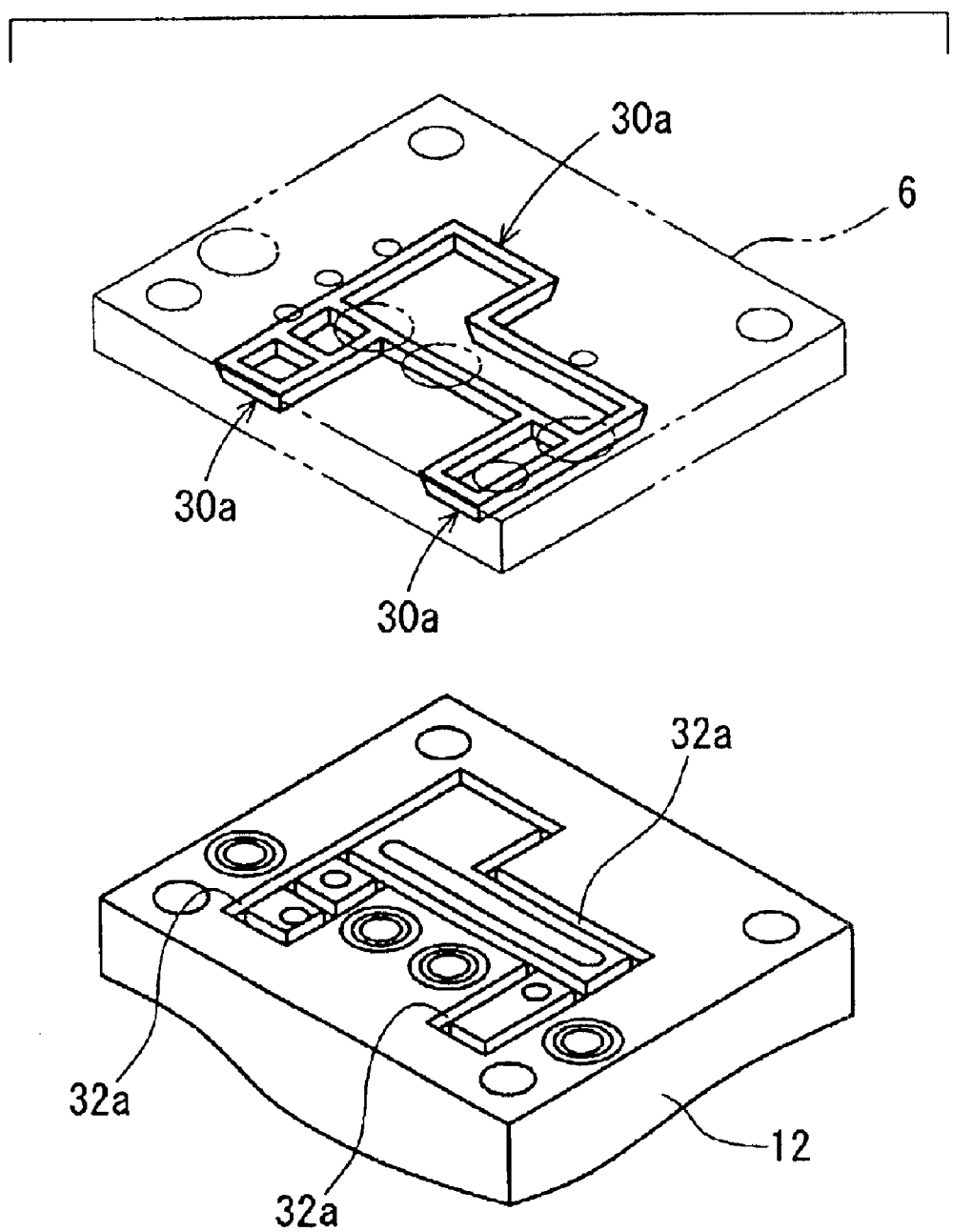
FIG. 2 is, with partial omission, a perspective view illustrating a first intermediate plate and a first valve mechanism block formed by resin molding.
Figure 3:
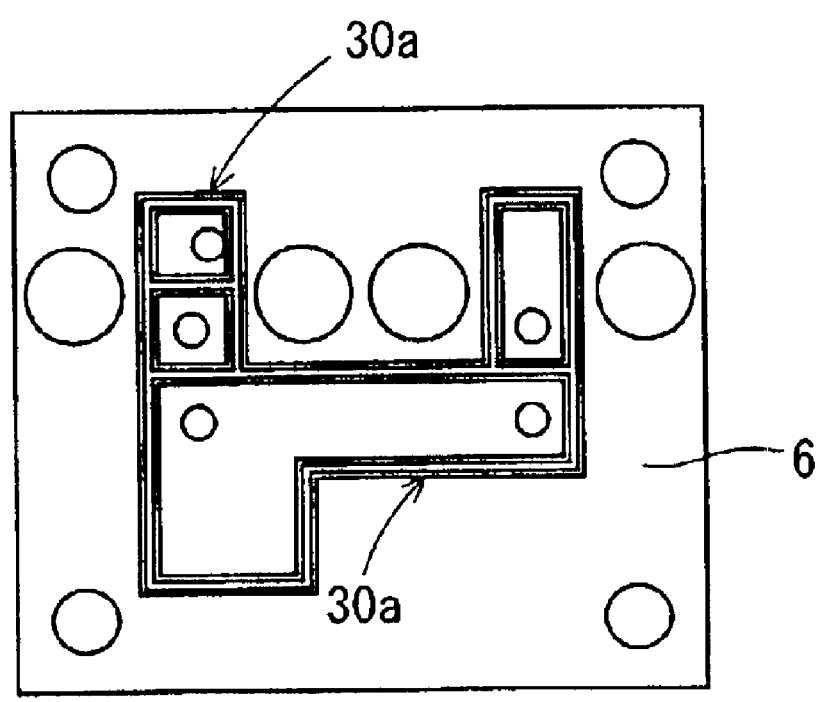
FIG. 3 is a bottom view illustrating the first intermediate plate shown in FIG. 2.
Figure 5:
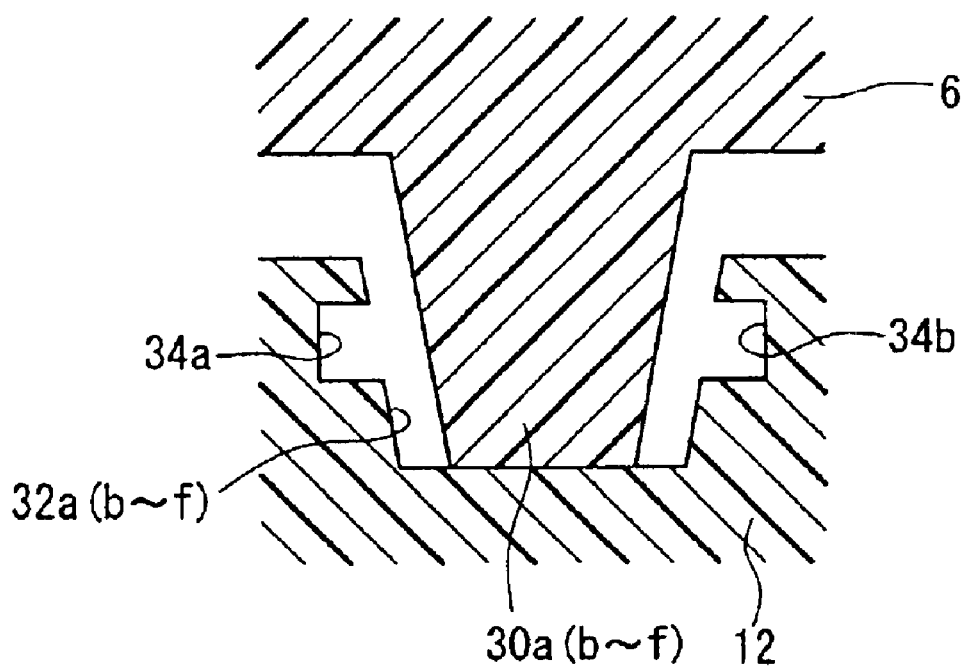
FIG. 5 is, with partial omission, a vertical sectional view illustrating a state before the ultrasonic welding in which an annular projection on each of various types of blocks or intermediate plates faces an annular recess.

In the step of resin molding, as shown in FIGS. 2 and 3, a first annular projection 30a is formed on a lower surface of the first intermediate plate 6 interposed between the first valve mechanism block 12 and a solenoid-operated valve 10. The first annular projection 30a protrudes by a predetermined length toward the first valve mechanism block 12 and has a shape corresponding to the shape of the conventional second seal member 8 (see FIG. 8). As shown in FIG. 5, the first annular projection 30a has a substantially trapezoidal shape in which the widths of the vertical cross section are gradually narrowed downwardly. Each of second to sixth annular projections 30b to 30f described later on also has a similar shape.

Figure 4:
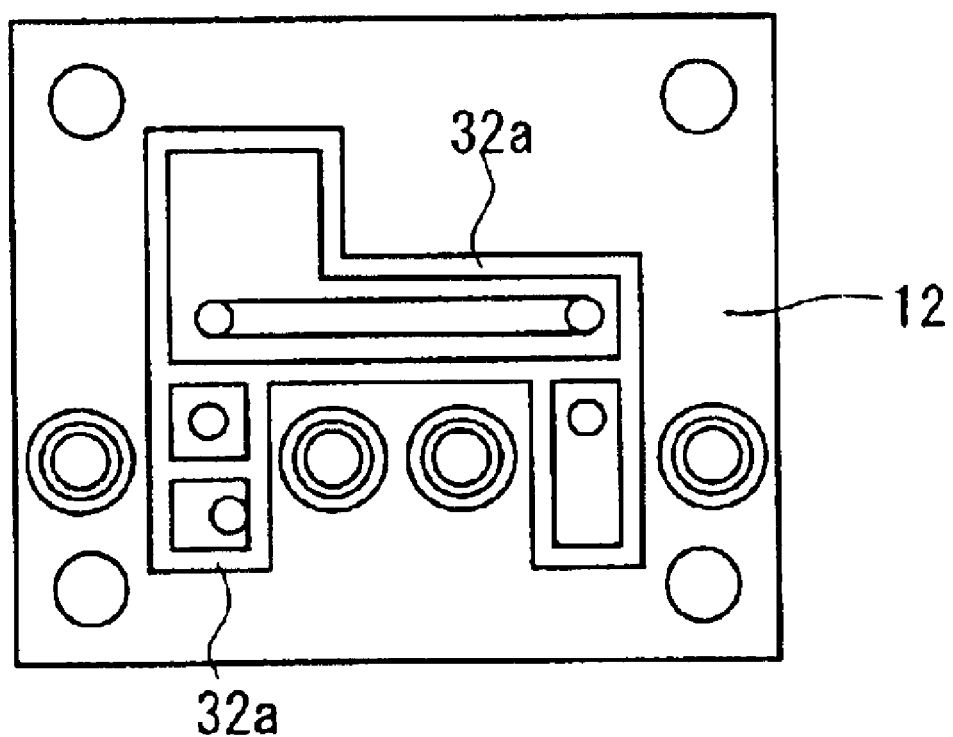
FIG. 4 is a plan view illustrating the first valve mechanism block shown in FIG. 2.

As shown in FIGS. 2 and 4, a first annular recess 32a is formed on an upper surface of the first valve mechanism block 12 opposing to the first annular projection 30a. The first annular recess 32a has a shape corresponding to the shape of the second seal member 8 and the first annular projection 30a of the first intermediate plate 6 faces the first annular recess 32a.

A second annular projection 30b is formed on one side of the second valve mechanism block 16 which is connected to the first valve mechanism block 12 (see FIGS. 1 and 7). The second annular projection 30b has a shape corresponding to the shape of the third seal member 14 (see FIG. 8). A second annular recess 32b is formed on one side of the first valve mechanism block 12 which is opposed to the second annular projection 30b (see FIG. 7). The second annular recess 32b has a shape corresponding to the shape of the third seal member 14 and the second annular projection 30b faces the second annular recess 32b.

Further, a third annular projection 30c is formed on one side of the second intermediate plate 20 interposed between the second valve mechanism block 16 and the ejector block 24. The third annular projection 30c has a shape corresponding to the shape of the fourth seal member 18 on the side connected to the second valve mechanism block 16 (see FIG. 8). On the other hand, a fourth annular projection 30d is formed on another side of the second intermediate plate 20 (see FIG. 7). The fourth annular projection 30d has a shape corresponding to the shape of the fifth seal member 22 on the side connected to the ejector block 24 (see FIG. 8).

In this arrangement, a third annular recess 32c is formed on one side of the second valve mechanism block 16 to which the second intermediate plate 20 is connected (see FIG. 7). The third annular recess 32c has a shape corresponding to the shape of the fourth seal member 18 and the third annular projection 30c faces the third annular recess 32c. A fourth annular recess 32d is formed on one side of the ejector block 24 to which the second intermediate plate 20 is connected (see FIGS. 1 and 7). The fourth annular recess 32d has a shape corresponding to the shape of the fifth seal member 22 and the fourth annular projection 30d faces the fourth annular recess 32d.

Further, a fifth annular projection 30e is formed on another side of the ejector block 24 to which the filter block 28 is connected. The fifth annular projection 30e has a shape corresponding to the shape of the sixth seal member 26 (see FIG. 8). A fifth annular recess 32e is formed on one side of the filter block 28 which is opposed to the ejector block 24 (see FIGS. 1 and 7). The fifth annular recess 32e has a shape corresponding to the shape of the sixth seal member 26 and the fifth annular projection 30e faces the fifth annular recess 32e.

Furthermore, a sixth annular projection 30f is formed on a bottom surface of the solenoid-operated valve 10 to which the first intermediate plate 6 is connected (see FIG. 7). The sixth annular projection 30f has a shape corresponding to the shape of the first seal member 4 (see FIG. 8). A sixth annular recess 32f is formed on an upper surface of the first intermediate plate 6 which is opposed to the solenoid-operated valve 10 (see FIGS. 1 and 7). The sixth annular recess 32f has a shape corresponding to the shape of the first seal member 4 and the sixth annular projection 30f faces the sixth annular recess 32f.

Figure 6:
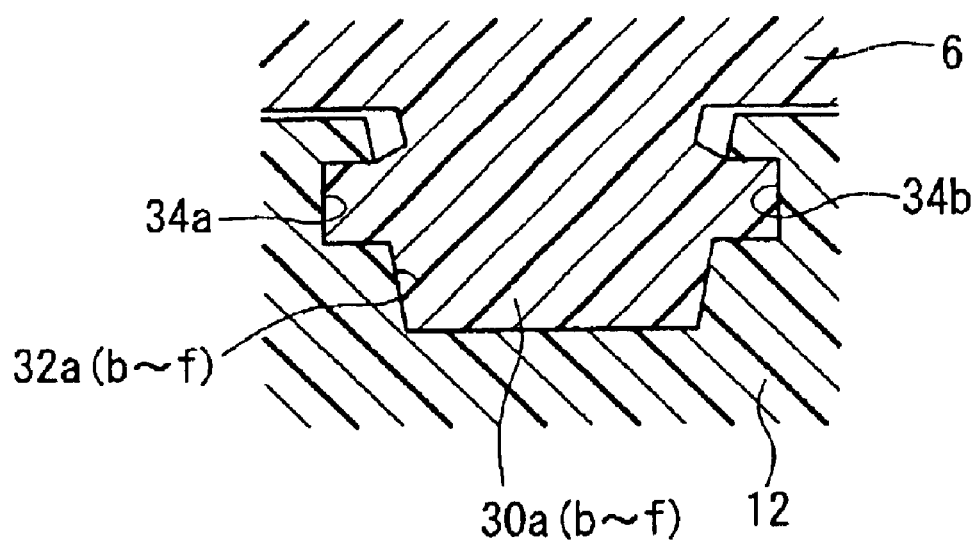
FIG. 6 is, with partial omission, a vertical sectional view illustrating a state after the ultrasonic welding in which the annular projection on each of various types of blocks or intermediate plates faces the annular recess.

As shown in FIGS. 5 and 6, it is preferable that a pair of grooves 34a, 34b are formed on opposing inner wall surfaces of the first to sixth recesses 32a to 32f respectively. The grooves 34a, 34b avoid projection of burrs formed when the ultrasonic welding is performed and are used to receive the burrs.

The annular projections and the annular recesses are formed at the respective joining portions between the respective blocks and the intermediate plates. Ultrasonic welding operation is carried out while and the annular projections face the corresponding annular recesses.

For example, the first valve mechanism block 12 and the first intermediate plate 6 are interposed between a pair of welding tips of an unillustrated ultrasonic welding machine. The ultrasonic vibration energy is applied to one welding tip to vibrate the welding tip in the lateral direction. The heat generated by the vibration makes the stress concentrate on the end of the first annular projection 30a formed on the first intermediate plate 6. The first annular projection 30a is deformed along with the shape of the first annular recess 32a (see FIG. 6). During this process, burrs are prevented from protruding outside and burrs are received by the grooves 34a, 34b formed on the first annular recess 32a.

The first annular projection 30a formed on the first intermediate plate 6 is fused along with the shape of the first annular recess 32a of the first valve mechanism block 12, and the first annular projection 30a is fixed in the first annular recess 32a. Accordingly, the first intermediate plate 6 is joined to the upper surface portion of the first valve mechanism block 12. In this case, the first annular projection 30a and the first annular recess 32a joined to one another are formed in conformity with the shape of the conventional second seal member 8. Therefore, the joined portions welded by the ultrasonic welding are sealed.

In other words, the joined portion welded by the ultrasonic welding maintains the air tightness of communication passages 40a to 40c for communicating passages 36a to 36c of the solenoid-operated valve 10 with passages 38a to 38c formed in the first valve mechanism block 12 (see FIG. 7).

Therefore, in the embodiment of the present invention, the second seal member 8 interposed between the first intermediate plate 6 and the first valve mechanism block 12 is unnecessary. Further, assembling operation with bolts or the like is simplified.

Similarly, the ultrasonic welding is performed between the solenoid-operated valve 10 and the first intermediate plate 6, between the first valve mechanism block 12 and the second valve mechanism block 16, between the second valve mechanism block 16 and the second intermediate plate 20, between the second intermediate plate 20 and the ejector block 24, and between the ejector block 24 and the filter block 28. Accordingly, the respective blocks are connected integrally, and thus the fluid unit 42 is completed (see FIG. 7).

In this embodiment, the first seal member 4 between the solenoid-operated valve 10 and the first intermediate plate 6, the second seal member 8 between the first intermediate plate 6 and the first valve mechanism block 12, the third seal member 14 between the first valve mechanism block 12 and the second valve mechanism block 16, the fourth seal member 18 between the second valve mechanism block 16 and the second intermediate plate 20, the fifth seal member 22 between the second intermediate plate 20 and the ejector block 24, and the sixth seal member 26 between the ejector block 24 and the filter block 28 are unnecessary.

Therefore, in the embodiment of the present invention, the first to sixth seal members 4, 8, 14, 18, 22, 26 are unnecessary, and thus the number of parts is reduced. Further, the assembling operation is simplified when the blocks or the plates disposed adjacently are assembled. Thus, the production cost is reduced.

If unillustrated auxiliary bolts are used, it is possible to secure tightening force at the portions connected by the ultrasonic welding. In place of the bolts, components may be fittingly connected or joined by pressing.

What is claimed is:

1. A method of producing a fluid unit, comprising the steps of:

molding various types of blocks such as valve mechanism and ejector blocks and intermediate plates of said fluid unit with resin by using molds so that annular projections and annular recesses having shapes corresponding to shapes of seal members respectively are formed at portions at which said blocks are joined to one another and at portions at which said blocks and intermediate plates are joined to one another; and performing ultrasonic welding while said annular projections are faced to said annular recesses so that said annular projections are fused along with said annular recesses to integrally join said blocks to one another and said blocks and said intermediate plates to one another respectively, and passages between said blocks and between said blocks and said intermediate plates are sealed by said joined portions.

2. The method according to claim 1, wherein a first annular projection is formed on a first intermediate plate interposed between a first valve mechanism block and a solenoid-operated valve, a first annular recess is formed on a connecting surface of said first valve mechanism block opposing to said first intermediate plate, and said ultrasonic welding is performed while said first annular projection faces said first annular recess.

3. The method according to claim 1, wherein a second annular projection is formed on a connecting surface of a second valve mechanism block connected to a first valve mechanism block, a second annular recess is formed on a connecting surface of said first valve mechanism block, and said ultrasonic welding is performed while said second annular projection faces said second annular recess.

4. The method according to claim 1, wherein a third annular projection is formed on a second intermediate plate interposed between a second valve mechanism block and an ejector block, a third annular recess is formed on a connecting surface of said second valve mechanism block, and said ultrasonic welding is performed while said third annular projection faces said third annular recess.

5. The method according to claim 1, wherein a fourth annular projection is formed on a second intermediate plate interposed between a second valve mechanism block and an ejector block, a fourth annular recess is formed on a connecting surface of said ejector block, and said ultrasonic welding is performed while said fourth annular projection faces said fourth annular recess.

6. The method according to claim 1, wherein a fifth annular projection is formed on an ejector block connected to a filter block, a fifth annular recess is formed on a connecting surface of said filter block, and said ultrasonic welding is performed while said fifth annular projection faces said fifth annular recess.

7. The method according to claim 1, wherein a sixth annular projection is formed on a solenoid-operated valve connected to a first intermediate plate, a sixth annular recess is formed on a connecting surface of said solenoid-operated valve, and said ultrasonic welding is performed while said sixth annular projection faces said sixth annular recess.

8. The method according to claim 1, wherein a pair of grooves are formed on opposing inner wall surfaces of said annular recess.

9. The method according to claim 1, wherein communication passages, which communicate passages of a solenoid-operated valve with passages formed in a first valve mechanism block, are sealed by said joined portions subjected to said ultrasonic welding.

* * * * *